United States Patent
Allen et al.

[11] Patent Number: 5,827,459
[45] Date of Patent: Oct. 27, 1998

[54] CONFORMING SHOE CONSTRUCTION USING GELS AND METHOD OF MAKING THE SAME

[75] Inventors: Bernie Allen, Wayland; Neil M. Goldman, Mansfield, both of Mass.

[73] Assignee: Acushnet Company, Fairhaven, Mass.

[21] Appl. No.: 604,309

[22] Filed: Feb. 21, 1996

Related U.S. Application Data

[63] Continuation of Ser. No. 404,675, Mar. 15, 1995, abandoned.

[51] Int. Cl.$^6$ ............................ B29C 65/00; B29C 71/00; B29C 31/50
[52] U.S. Cl. .................. 264/46.4; 264/46.5; 264/46.6; 264/238; 264/244; 12/142 R; 12/146
[58] Field of Search .................................. 264/244, 46.4, 264/46.5, 46.6, 238; 12/142 R, 146

[56] References Cited

U.S. PATENT DOCUMENTS

| | | | |
|---|---|---|---|
| Re. 32,834 | 1/1989 | Cordts et al. | 524/310 |
| Re. 35,068 | 10/1995 | Tanaka et al. | 523/300 |
| 3,237,319 | 3/1966 | Hanson . | |
| 3,548,420 | 12/1970 | Spence . | |
| 3,765,422 | 10/1973 | Smith | 128/594 |
| 4,038,762 | 8/1977 | Swan, Jr. . | |
| 4,083,127 | 4/1978 | Hanson . | |
| 4,211,236 | 7/1980 | Krinsky . | |
| 4,243,754 | 1/1981 | Swan, Jr. . | |
| 4,252,910 | 2/1981 | Schaefer . | |
| 4,255,202 | 3/1981 | Swan, Jr. . | |
| 4,293,440 | 10/1981 | Elphingstone et al. | 252/317 |
| 4,471,538 | 9/1984 | Pomeranz et al. . | |
| 4,541,186 | 9/1985 | Mulvihill . | |
| 4,555,344 | 11/1985 | Cussler | 210/670 |
| 4,564,966 | 1/1986 | Chen | 12/146 B |
| 4,616,430 | 10/1986 | McQuiggin . | |
| 4,662,087 | 5/1987 | Beuch . | |
| 4,728,551 | 3/1988 | Jay . | |
| 4,732,930 | 3/1988 | Tanaka et al. | 524/742 |
| 4,744,157 | 5/1988 | Dubner . | |
| 4,771,554 | 9/1988 | Hannemann . | |
| 4,783,910 | 11/1988 | Boys, II et al. . | |
| 4,808,469 | 2/1989 | Hiles . | |
| 4,817,304 | 4/1989 | Parker et al. . | |
| 4,828,701 | 5/1989 | Cussler | 210/634 |
| 4,863,613 | 9/1989 | Johnson et al. | 210/670 |
| 4,876,805 | 10/1989 | Peoples . | |
| 4,934,072 | 6/1990 | Fredericksen et al. . | |
| 4,957,620 | 9/1990 | Cussler | 210/635 |
| 4,977,691 | 12/1990 | Orchard, III . | |
| 5,000,955 | 3/1991 | Gould et al. | 424/409 |
| 5,005,575 | 4/1991 | Geri . | |
| 5,015,427 | 5/1991 | Sosnow . | |
| 5,058,585 | 10/1991 | Kendall et al. . | |
| 5,067,255 | 11/1991 | Hutcheson . | |
| 5,070,629 | 12/1991 | Graham et al. . | |

(List continued on next page.)

FOREIGN PATENT DOCUMENTS

US94/05400 11/1995 WIPO .

OTHER PUBLICATIONS

"Revolutionary ATS Technology".

*Primary Examiner*—Jan H. Silbaugh
*Assistant Examiner*—Suzanne E. Mason
*Attorney, Agent, or Firm*—Pennie & Edmonds LLP

[57] ABSTRACT

A shoe that conforms to foot contours and provides cushioning is comprised of a shoe sole and a shoe upper attached to the shoe sole. The shoe upper is comprised of an outer layer, an inner layer and a conforming layer therebetween, wherein a first portion of the conforming layer is comprised of viscoelastic gel and a second portion of the conforming layer is comprised of environmentally-responsive gel. The environmentally-responsive gel is preferably a temperature-responsive gel that will react to the heat emanating from a foot inserted into the shoe to express a liquid. The viscoelastic gel is preferably a soft, flowable gel that conforms to foot contours.

17 Claims, 9 Drawing Sheets

U.S. PATENT DOCUMENTS

| | | |
|---|---|---|
| 5,097,607 | 3/1992 | Fredericksen . |
| 5,100,933 | 3/1992 | Tanaka et al. ............................ 523/300 |
| 5,101,580 | 4/1992 | Lyden . |
| 5,131,174 | 7/1992 | Drew et al. . |
| 5,149,588 | 9/1992 | Fukushima et al. ................. 428/411.1 |
| 5,155,927 | 10/1992 | Bates et al. . |
| 5,160,627 | 11/1992 | Cussler et al. ........................... 210/639 |
| 5,183,879 | 2/1993 | Yuasa et al. ............................. 528/503 |
| 5,203,793 | 4/1993 | Lyden . |
| 5,242,491 | 9/1993 | Mamada et al. ........................ 106/241 |
| 5,262,468 | 11/1993 | Chen . |
| 5,274,018 | 12/1993 | Tanaka et al. ........................... 524/166 |
| 5,287,638 | 2/1994 | Preston . |
| 5,311,678 | 5/1994 | Spademan . |
| 5,313,717 | 5/1994 | Allen et al. . |
| 5,315,769 | 5/1994 | Barry et al. . |
| 5,336,708 | 8/1994 | Chen ....................................... 524/474 |
| 5,343,638 | 9/1994 | Legassie et al. . |
| 5,357,693 | 10/1994 | Owens . |
| 5,363,570 | 11/1994 | Allen et al. . |
| 5,383,290 | 1/1995 | Grim . |
| 5,403,893 | 4/1995 | Tanaka et al. ........................... 525/218 |
| 5,430,961 | 7/1995 | Faulconer et al. ......................... 36/93 |
| 5,444,926 | 8/1995 | Allen et al. ................................. 36/93 |
| 5,475,882 | 12/1995 | Sereboff ..................................... 3/450 |
| 5,508,334 | 4/1996 | Chen ....................................... 524/474 |

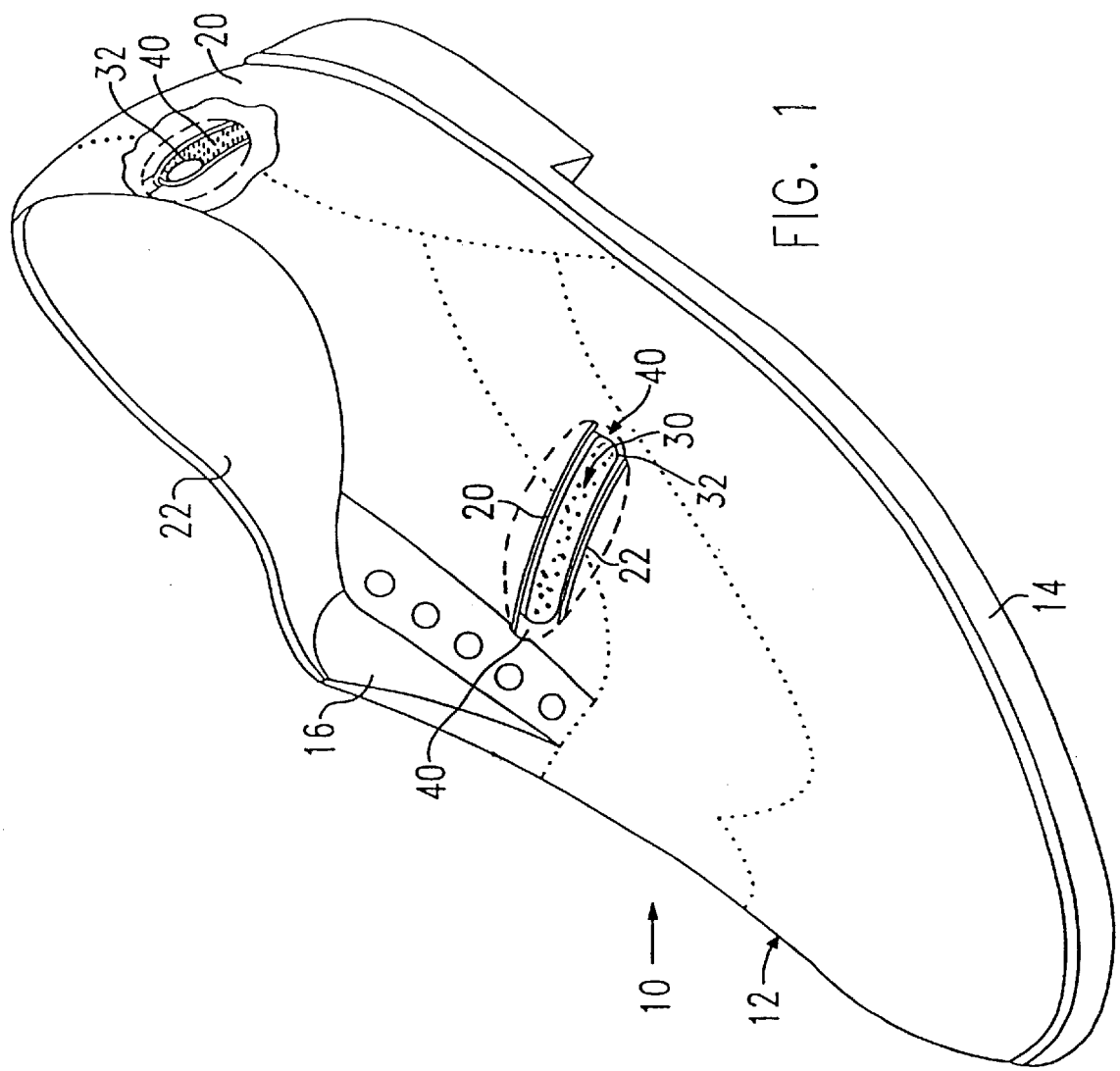
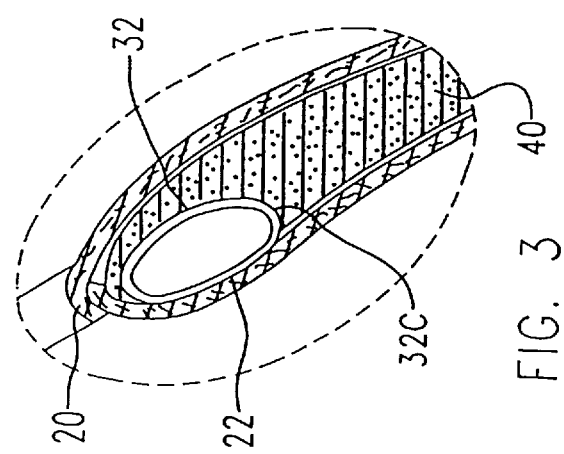

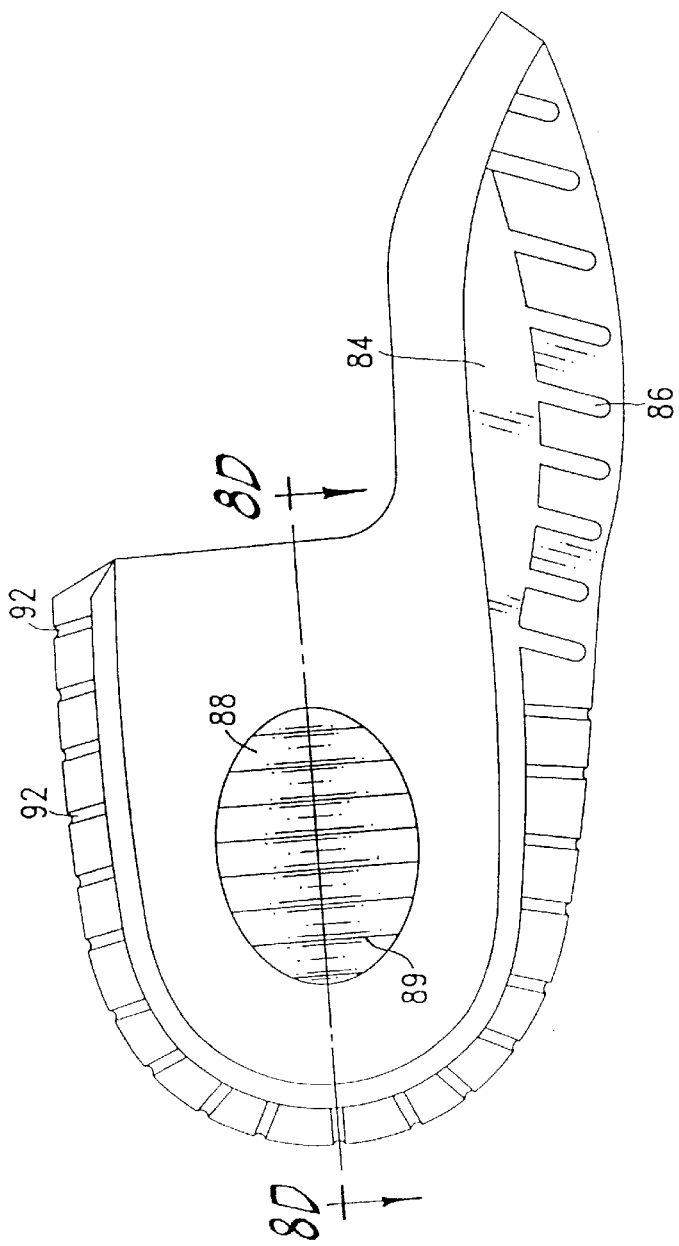
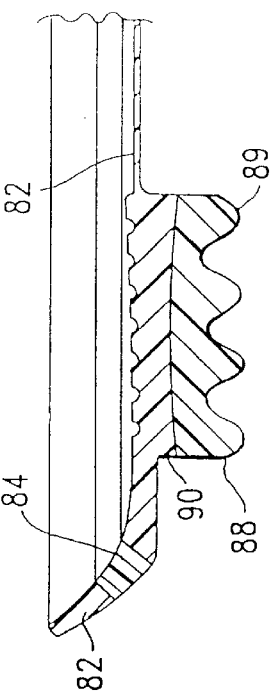
FIG. 8C
FIG. 8D

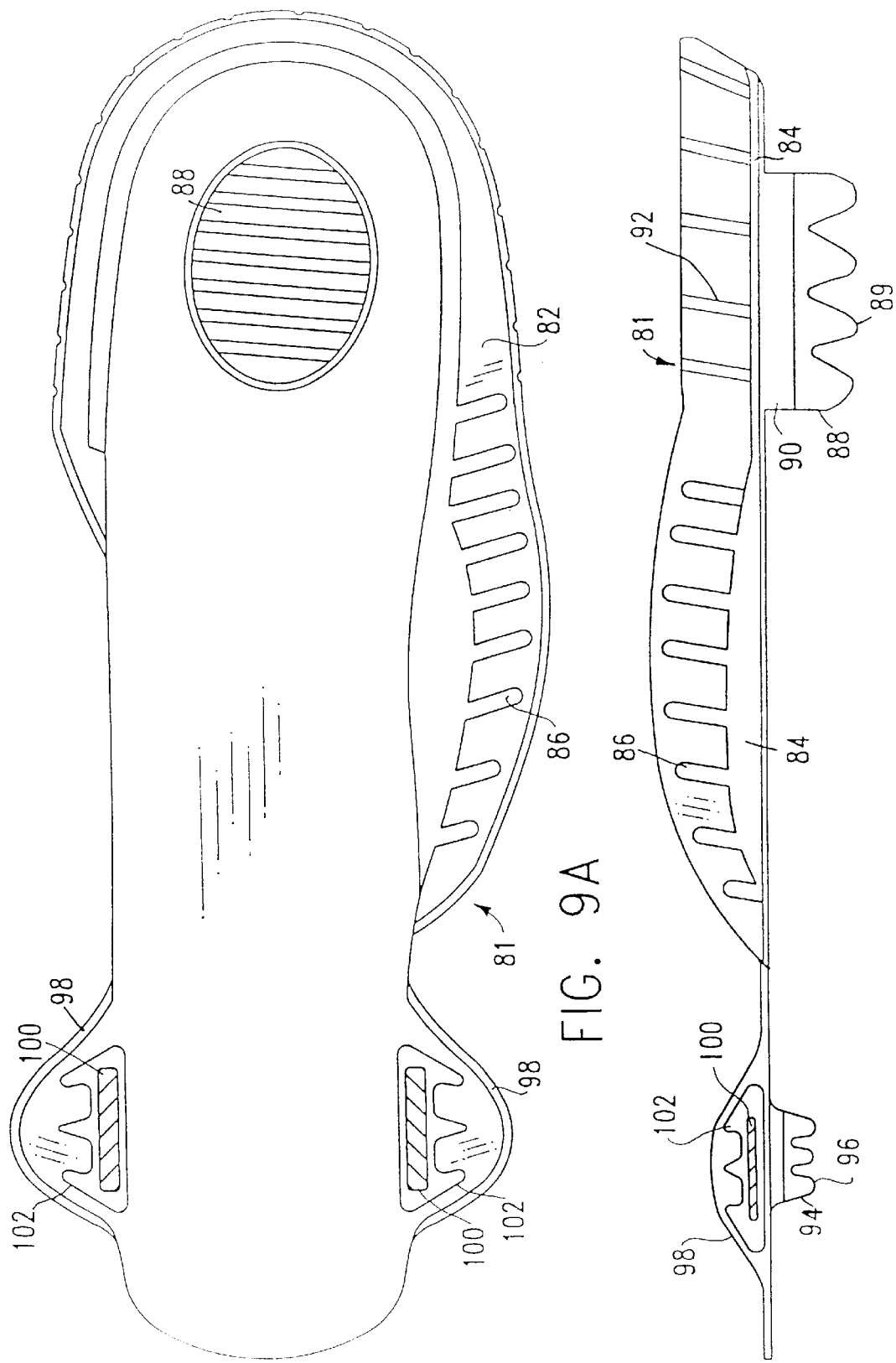

CONFORMING SHOE CONSTRUCTION USING GELS AND METHOD OF MAKING THE SAME

This is a continuation of application Ser. No. 08/404,675, filed Mar. 15, 1995, now abandoned.

TECHNICAL FIELD

This invention relates to a customized fitting shoe construction using gels and a method of forming the same. More particularly, the invention relates to a shoe that incorporates various gels to provide a conforming medium for a customized fitting shoe upper, tongue and foot bed and to methods of forming the shoe upper, tongue and foot bed.

BACKGROUND OF THE INVENTION

Various methods and devices have been employed in shoes to add cushioning to the shoe and to provide complementary custom fitting configurations to the contours of a foot inserted into the shoe. For example, U.S. Pat. No. 5,313,717, is directed to a shoe which incorporates reactive-energy, fluid-filled cavities in the shoe mid-sole. As discussed therein, typical prior art devices provide cushioning and custom fit to the foot inside the shoe by constructing the shoe sole from a softer, more resilient material or incorporating fluid filled pads or bladders in the shoe.

The use of gels to provide a conforming fit or cushion is known in the prior art. However, the prior art gels generally set to fit the contours of a foot and do not provide a soft cushion fit or they are soft liquid gels that must be placed in a bladder.

In other shoes designed to provide cushioning or custom fitting, either an air filled foam or an air "pump" has been used to conform to the foot which is inserted into the shoe. The foam is a material that reacts to foot pressure by allowing the air therein to become compressed and/or escape and therefore resiliently compresses upon pressure from the foot. The material does not have the capability to expand to the non-pressure areas of the foot. Shoes that incorporate an air "pump" fill in air around the foot so that the shoe conforms to the foot therein, but in doing so, increases the pressure on the foot. This increased pressure and foot surrounding air pocket tends to greatly increase the foot temperature. Thus, these solutions provide fit or comfort either by merely displacing at locations of higher pressure or by increasing the pressure completely around the foot. Thus, these shoes do not conform fully to the foot therein at normal pressures.

SUMMARY OF THE INVENTION

The present invention is directed to a shoe which conforms to contours of a foot inserted into the shoe. The shoe employs a solid foam matrix that contains elements of a soft, highly flowable viscoelastic gel, a foam and/or an environmentally-responsive gel. Preferably, the shoe uses soft elastomeric gel or foamed elastomeric gel to provide a flowable, viscoelastic medium that will conform the foot as the foot is inserted into the shoe. The invention is also directed to the use of a temperature-responsive gel that can react to the heat exerted by the foot inserted into the shoe to provide a conforming medium for fit and cushioning. Each of these gels can be located in proper position by surrounding the gels with a memory foam or other commercially available foams.

In a preferred embodiment of the invention, the shoe incorporates an environmentally-responsive gel. An environmentally-responsive gel is a microporous, fast responsive, crosslinked gel obtainable from a polymeric precursor, the gel being of sufficient flexibility to enable the gel to be reversibly responsive to a change in an environmental condition. The environmentally-responsive gel can be made from any responsive polymer with side groups that can react with a di- or multi- functional crosslinking molecule. The polymers can have hydroxyl, acid or amine side groups and which have lower critical solution temperatures in aqueous solutions together with water-soluble crosslinkers. Even more particularly, the gel is a temperature-responsive gel and is able to undergo a phase separation which is temperature-induced. Still further, the precursor is preferably a linear polymer or cellulose ether such as hydroxypropyl acrylate/hydroxyethyl acrylate copolymer. Also, the water-based fluid used to make the gel can include sucrose in the range of 30% to 60% to vary the reaction temperature.

The invention is also directed to the use of a polyurethane gel that provides a highly flowable viscoelastic medium and does not require a gel bladder. The polyurethane gel can be provided in various hardnesses to provide proper mediums for shoe comfort, including fit and cushioning. The polyurethane gel is preferably a soft elastomer with high sol (plasticizer) fraction which can include a high molecular weight triol (MW greater than 6000) and a diisocyanate. The polyol can be made of Arcol E-452 and the plasticizer can be a Paraffin oil or dipropylene glycol dibenzoate.

In another embodiment of the present invention, the flowable viscoelastic gel is a butadiene style rubber which can be prepared from oil and polyisobutadiene. Preferably, oil such as Kaydol and a styrene ethylene butadiene styrene triblock medium molecular weight rubber polymer such as Kraton 1650 M. Kaydol is a paraffin (55%) and naphtenic (45%). By increasing the percentage of Kraton, the firmness of the gel can be increased for various locations where a firmer gel is desired. Still further, plastic, expanded, resilient, hollow microspheres such as Expancel 091 DE80, expanded glass hollow microspheres or a blowing agent can be added to the gel to reduce weight or the gel can be frothed with air using ultrasonic cavitation.

Still further, the foam can be comprised of a polyurethane foam with hollow microspheres or a blowing agent. In another embodiment, a memory foam can be comprised of a polyol, antifoam agent, catalyst and Isocyanate.

The invention is directed to a shoe that conforms to the foot contours by incorporating a shoe upper that is comprised of three layers; the shoe outer layer, the shoe inner layer, and a conforming layer therebetween. The conforming layer can be comprised of portions made from highly flowable, viscoelastic gels, foam and temperature-responsive gels. Preferably, the invention includes soft, highly flowable viscoelastic gel provided in areas of the shoe that correspond to those areas of the foot that are generally highly contoured or have greater curvature for better fit and comfort. In areas where stability or shock cushioning is desired, a more viscous (less flowing gel) is used and in areas where fit and comfort are required, a softer, less viscous (more flowing) gel is used.

As stated above, the invention can also include a temperature-responsive gel that reacts to the heat dissipated from the foot inserted into the shoe to express a liquid that will fill a bladder to allow the shoe to further conform and provide cushioning and securing fit for the foot therein.

Further, the invention is directed to a shoe incorporating a tongue which can have portions made from highly flowable, viscoelastic gels and temperature-responsive gels to provide a customized fit and cushioning to the top of the foot that has been inserted into the shoe.

Still further, the present invention is directed to a shoe which conforms to the foot by providing a foot bed comprised of viscoelastic gels and/or temperature-responsive gels therein to conform to and provide cushioning for the foot bottom. Preferably, the shoe foot bed is formed of a low-flowable, harder gel such that it provides supportive cushioning for the foot bottom, for absorbing the impacts of walking and the like. Further, the foot bed should provide a soft, highly flowable gel to provide custom fit and comfort for the foot and, particularly for the foot arch and heel. This is preferably accomplished with the proper placement of various elastomeric gels having proper hardnesses and viscosities to provide comfortable and supportive viscoelastic mediums against the foot. Still further, the foot bed is formed with the combination of gels encapsulated in a polyurethane foam or preferably a memory foam matrix. This provides customizable fit, comfort, cushioning and stability all in the same system.

The present invention is also directed to a method of forming a customized fitting shoe. The method includes forming a shoe upper which is comprised of the steps of molding flowable, viscoelastic gel and foam to form a conforming layer of a shoe upper. Preferably, the method of forming a customized fitting shoe upper is comprised of the steps of pouring flowable viscoelastic gel into proper locations of a mold, pouring polyurethane foam or memory foam ingredients into the mold, closing the top of the mold which can have the shoe inner layer attached thereto, heating the mold and removing the gel, formed foam and shoe inner layer. Then a temperature-responsive gel and bladder containing the same can be placed in proper locations and an outer layer can be attached to the opposite side of the conforming layer from the inner layer.

Still further, the method includes forming a temperature-responsive gel and bladder by vacuum forming an approximately 10 mil thick plastic bottom film into a mold, placing a die cut temperature responsive gel which is at a relatively cold temperature into the mold cavity, placing a flat top layer of approximately 5 mil thick plastic film over the mold, attaching the top and bottom films using radio frequency or other method.

Even still further, the present invention is directed to a method of forming a shoe foot bed comprising the steps of pouring relatively hard, high viscosity, viscoelastic gel into the foot bed heel plug section of a mold, pouring a relatively soft, highly flowable, viscoelastic gel into proper locations of the mold for providing a conforming fit and comfort, pouring polyurethane foam or memory foam ingredients into the mold, covering the mold with the mold top, which can have the foot bed cover fabric attached thereto, and heating the mold.

BRIEF DESCRIPTION OF THE DRAWINGS OF THE PREFERRED EMBODIMENT

FIG. 1 is a perspective view of a shoe according to the present invention and incorporating a temperature-responsive gel and bladder for the same.

FIG. 3 is an enlarged, cross-sectional view of the temperature-responsive gel bladder in the shoe upper.

FIG. 8C is a bottom view of a foot bed according to the present invention.

FIG. 8D is a sectional view taken along the line XX in FIG. 8A.

FIG. 9A is a top view of a second embodiment of the foot bed according to the present invention.

FIG. 9B is a cross-sectional, side view of the second embodiment of the foot bed according to the present invention.

DETAILED DESCRIPTION OF THE PREFERRED EMBODIMENTS

Figure 2:
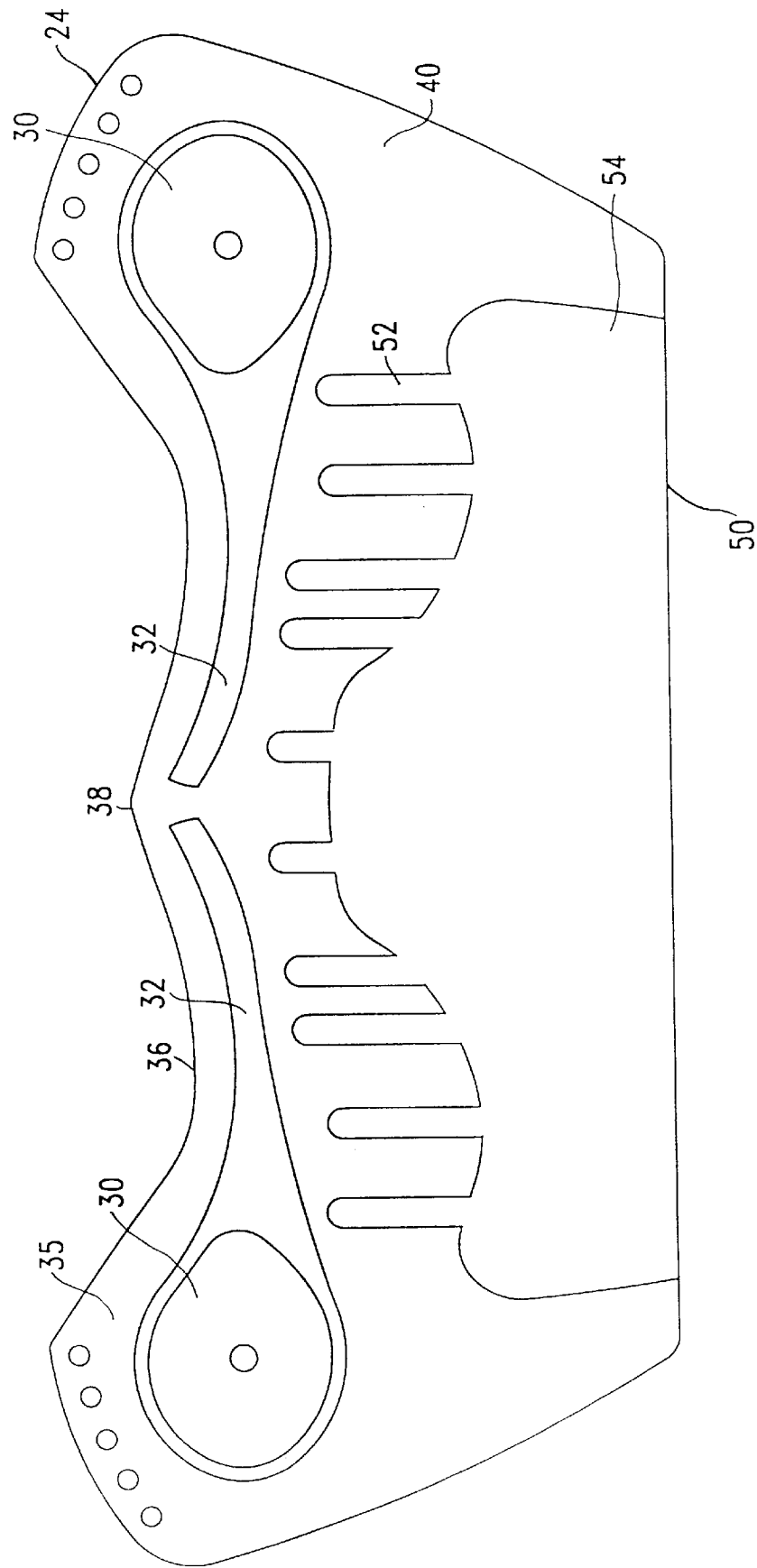
FIG. 2 is a perspective view of a conforming layer of the shoe according to the present invention.

Referring to FIG. 1, the preferred embodiment of the present invention is a shoe 10 that incorporates a shoe upper 12 and a shoe sole 14. Inside the shoe 10 and not shown is a shoe mid-sole. The shoe upper 12 is comprised of an outer layer 20 and an inner layer 22. In between the inner and outer layer is a conforming layer 24 as disclosed in FIG. 2. In the preferred embodiment, the inner layer 22 is made of brush nylon or leather and the outer layer 20 is made of leather.

The conforming layer 24 in FIG. 2 is comprised of a first flowable viscoelastic gel portion 50, a second temperature-responsive gel portion 30 and its bladder 32 and a third foam portion 40.

The viscoelastic gel portion 50 is preferably comprised of a flowable viscoelastic gel that is incompressible, i.e., it retains its volume upon compression. Therefore, this material, when compressed by pressure from the foot inserted into the shoe, will flow into another location where the pressure is not as great. In the preferred embodiment, the viscoelastic gel is molded into a body section 54 and a plurality of connected fingers 52. This enables the viscoelastic gel portion 50 to conform the foot inserted into the shoe. And as one skilled in the art would appreciate, the viscoelastic gel section 50 can be molded in many shapes. However, in the preferred embodiment, the viscoelastic gel portion 50 should be molded into areas of the shoe which correspond to highly contoured areas of the foot. For instance, the heel of the foot generally tends to be very contoured and, therefore, the viscoelastic gel portion 50 is preferably located so that the shoe can substantially conform the foot heel. Thus the viscoelastic gel 50 preferably extends to correspond to the heel bone and malleoli bones of the foot.

Preferably, the viscoelastic gel portion 50 is comprised of a polyurethane gel, but other gels which disclose the desired properties of elasticity and flowing nature can also be used. In the shoe upper, the viscoelastic gel is preferably of a relatively soft, highly flowable gel. That is, the gel has a -000 hardness of approximately 10 to 100 and preferably about 40. Moreover, the viscoelastic gel portion can be formed of various hardnesses to best conform to the foot. For example, the body section 54 can be made from a soft gel of approximately 40 to 60 -000 hardness and the extending fingers can be made from the same gel hardness or a gel having a lower hardness and being more flowable.

Another advantage to using a viscoelastic gel is that the gel does not need to be encapsulated into a bladder, i.e. the gel is not surrounded by a plastic liner to limit the flow thereof. Since the preferred material is a flowable gel, it can be formed directly between the front an back layers 20 and 22.

In the one embodiment, the flowable viscoelastic gel is a soft elastomer with high sol (plasticizer) fraction which can include a high molecular weight triol (MW greater than 6000) and a diisocyanate. The polyol can be made of Acrol E-452 brand polyol and the plasticizer can be a Paraffin oil or dipropylene glycol dibenzoate.

In another embodiment, the flowable viscoelastic gel is a butadiene style rubber. The rubber can be prepared from oil and polyisobutadiene. Preferably, oil such as Kaydol and a styrene ethylene butadiene styrene tri block medium molecular weight rubber polymer such as Kraton is used. More preferably, 60 ml of Kaydol and 7.5 g of Kraton 1650 M are mixed and heated to 140 degrees F. for 1 hour. The material is stirred twice during the 1 hour and then poured into a cool and set into a gel. By increasing the percentage of Kraton, the firmness of the gel can be increased for various locations where a firmer gel is desired or vice versa. Still further, expanded, resilient, plastic, hollow microspheres such as Expancel 091 DE80, expanded, glass microspheres or a blowing agent can be added to the gel to reduce the weight of the gel. Still further, the gel and be frothed with air using ultrasonic cavitation or unexpanded Expancel DU grade microspheres can be used and expanded during processing.

A temperature-responsive gel is described as a crosslinked three dimensional polymeric network that contains a substantial quantity of liquid so that the properties of the gel are determined by both the polymeric network and the liquid. If the liquid is water, the gel is commonly called a "hydrogel." The volume of this type of "reactive gel" may contract by a factor of up to several hundred percent when the gel undergoes a change in external conditions, such as temperature, Ph, solvent or solvent concentration, ionic concentration, light, pressure or electric field. Preferably, the gel used for this application is of the type that reacts to temperature and/or pressure and recovers once the external condition is removed.

The network material of a responsive hydrogel as used in the preferred embodiment, may be comprised of a number of polymeric materials that possess a lower critical solution temperature (LCST). The term LCST is the temperature below which the polymer is substantially soluble in liquid and above which the polymer is substantially insoluble. Therefore, the responsive gel forms a two phase system.

The preferred temperature-responsive gel portion 30 is comprised of a hydrogel. Examples of gels are given in U.S. Pat. No. 5,183,879 and PCT Patent Publication No. PCT WO 95/31498. The preferred temperature-responsive gel contracts upon application of heat from the foot inserted within shoe 10 and thereby extracts water from the gel. As the shoe temperature rises from the foot that is inserted therein and moves during normal activity, the gel contracts. Therefore, the temperature-responsive gel section 30 can be located anywhere in the shoe to assist in conforming to the foot contours, but, preferably, is located at the shoe midsection which generates substantial heat. The gel bladder 32 is used to contain the water solution 34 that is expelled from the contracted gel and allows the water solution 34 to flow around and conform to the foot that is inserted into the shoe. Preferably, the bladder 32 extends from the quarter 35, around the collar 36 to the achilles tendon area 38 for providing support for the collar, which assists in maintaining the foot within the shoe, and for assisting in protecting the achilles tendon.

Referring to FIG. 3, an enlarged section of the gel bladder 32 is shown in a cavity 32c formed between the outer layer of shoe material 20 and the inner layer of shoe material 22. In the preferred embodiment, the gel bladder 32 is extended from the temperature-responsive gel portion 30 in the quarter 35, around the collar 36 to the achilles tendon section 38 such that water solution 34 can be distributed from the midsection of the foot towards the heel location and allows the shoe to better conform thereto as the shoe is heated.

In this embodiment, the temperature-responsive gel in the shoe is an environmentally-responsive gel. An environmentally-responsive gel is a microporous, fast responsive, crosslinked gel obtainable from a polymeric precursor, the gel being of sufficient flexibility to enable the gel to be reversibly responsive to a change in an environmental condition such as temperature. The gel can be made from any responsive polymer with side groups that can react with a di- or multi- functional crosslinking molecule. The polymers can have hydroxyl, acid or amine side groups and which have lower critical solution temperatures in aqueous solutions together with water-soluble crosslinkers. Even more particularly, the gel is preferably a temperature-responsive gel and is able to undergo a phase separation or phase transition which is temperature induced. Still further, the precursor is preferably a linear polymer or cellulose ether, and more particularly, hydroxypropyl acrylate/hydroxyethyl acrylate copolymer. Preferably the hydroxypropyl acrylate/hydroxyethyl acrylate copolymer gel is comprised of between 50 to 100 percent hydroxypropyl acrylate and between 50 to 0 percent hydroxyethyl acrylate. Also, the water-based fluid used to make the gel can include sucrose in the range of 30% to 60% to vary the reaction temperature. Further, to enable the temperature-responsive gel to operate at lower temperatures, glycerin or glycol can be added to reduce the freezing temperature of the solution.

The foam portion 40, which makes up the remainder of the conforming layer 24, can be made of many standard foams that are available. The foam portion 40, however, is preferably made of a memory foam, i.e., a foam that deforms upon compression and once the pressure is released, will slowly return to its original position. The foam portion 40 is preferably made with to a Shore C hardness of approximately 25. The foam portion 40 is used to surround and secure the flowable, viscoelastic gel portion 50 and the temperature-responsive gel portion 30.

The foam portion 40 can be comprised of a polyol, antifoam agent, catalyst and Isocyanate. Still further, the memory foam can be formed from approximately 58% Arcol LG-168, approximately 1% water, approximately 0.5% Dabco 131, approximately 0.5% Dabco 33LV and approximately 40% Isocyanate 2143L.

Figure 4:
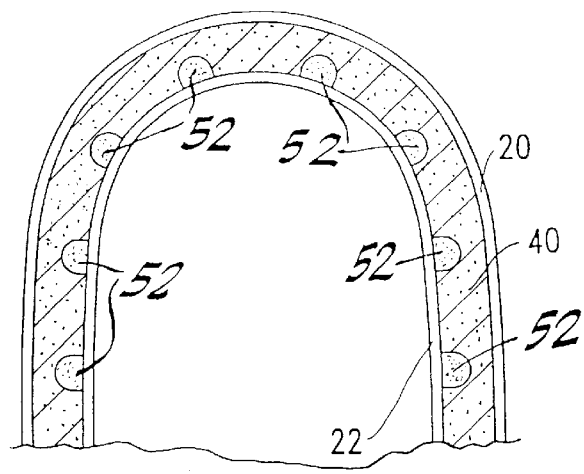
FIG. 4 is a cross-sectional view of the heel of a shoe according to the present invention incorporating viscoelastic gel and foam therein to conform to the foot.

FIG. 4 discloses a cross-section of the preferred embodiment of the shoe heel wherein the plurality of viscoelastic fingers 52 are disclosed extending in the vertical direction up the shoe heel so that the viscoelastic material can conform to the foot that is inserted therein. The viscoelastic fingers 52 are molded and then encapsulated by the foam material 40. The fingers extend into the concave contours of the foot heal to provide a more securing fit.

Figure 5:
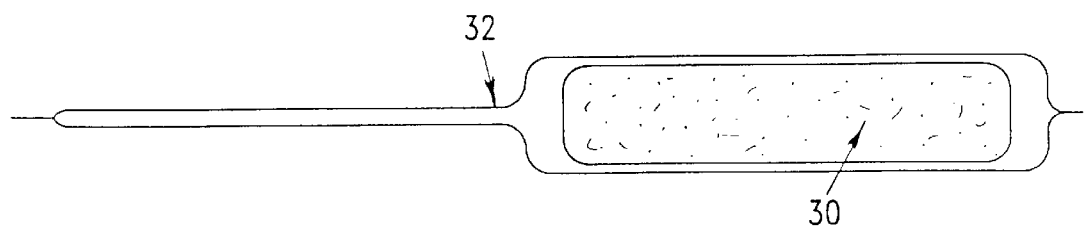
FIG. 5 is a cross-sectional view of the temperature-responsive gel and bladder in the expanded state.

The temperature-responsive gel 30 and gel bladder 32 are shown in the expanded or cool state in FIG. 5. As stated above, the temperature-responsive gel 30 is expanded at temperatures below the lower critical solution temperature, which should be between approximately 60 to 90 degrees Fahrenheit. In the expanded state the gel contains a water-based solution therein. Thus, the bladder 32 is relatively empty when the gel 30 is expanded.

Figure 6:
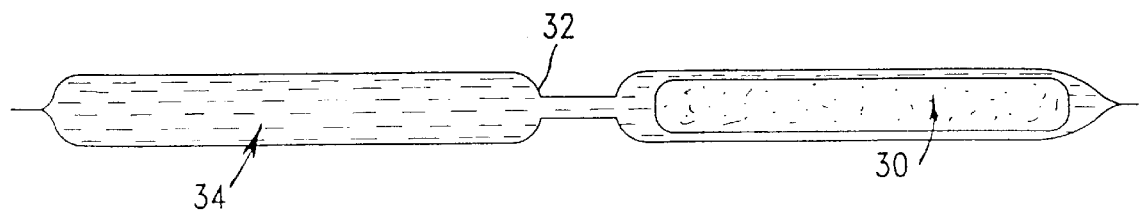
FIG. 6 is a cross-sectional view of the temperature-responsive gel and bladder in the contracted state.

The temperature-responsive gel 30 and gel bladder 32 are shown in the contracted or heated state in FIG. 6. The temperature-responsive gel 30 is heated due to the heat emitted from the foot inside the shoe. As the temperature-responsive gel 30 is heated above lower critical solution temperature the gel contracts and the water solution 34 therein is expressed from the gel and into the bladder 32. Thus, the water solution 34 dynamically flows to areas under less pressure as the shoe is heated. This enables the shoe to dynamically conform to the foot that is inserted therein.

As the temperature-responsive gel 30 cools when the foot is removed from the shoe the gel expands and retracts the water solution 34 from the bladder 32. In other words, the temperature-responsive gel 32 returns to its expanded state as shown in FIG. 5.

Figure 7:
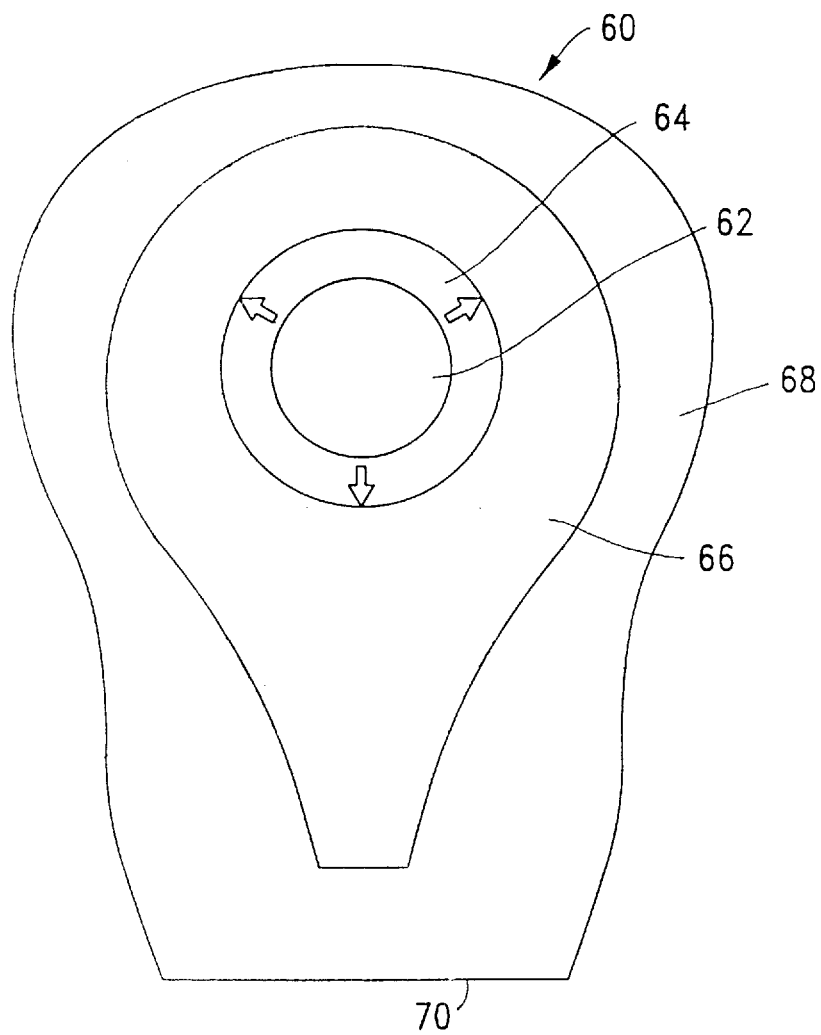
FIG. 7 is a top view of the conforming layer of a shoe tongue according to the present invention.
Figure 8A:
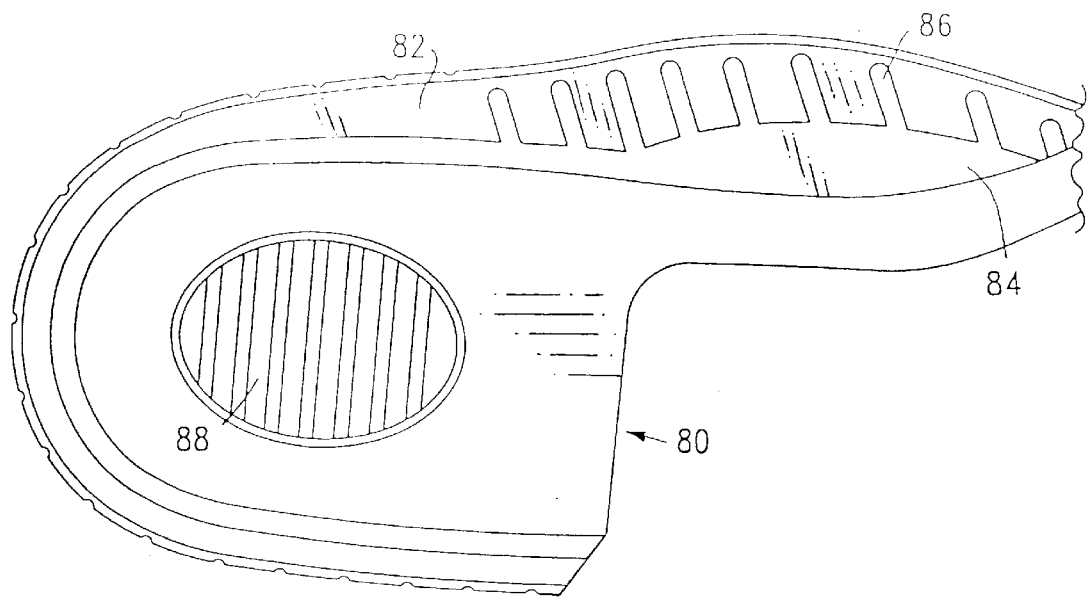
FIG. 8A is a top view of a foot bed according to the present invention.
Figure 8B:
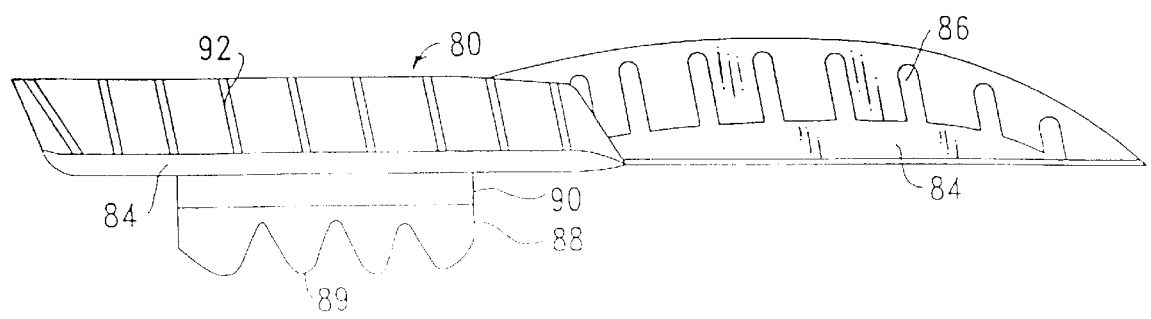
FIG. 8B is a side view of a foot bed according to the present invention.

FIG. 7 discloses the preferred embodiment of the shoe tongue conforming layer 60. The shoe tongue 16 is shown in FIG. 1 and is attached to the shoe 10 such that it covers a portion of the top of the forefoot that is inserted into the shoe 10. The conforming layer 60 is preferably comprised of a temperature-responsive gel portion 62 including gel bladder 64 extending thereabout, a viscoelastic gel portion 66 and a foam portion 68 enveloping both of the gel sections 62 and 66. The tongue conforming layer 60 is enveloped by an inner layer and an outer layer (not shown) substantially similar to the inner and outer layers of the shoe upper discussed above. The shoe tongue is then attached to the shoe upper along the bottom edge 70.

FIGS. 8A–8D discloses a foot bed 80 incorporating a foam main body section or foam pad 82, a plurality of relatively soft, flowable viscoelastic gel sections 84, relatively soft, flowable viscoelastic gel fingers 86 and a relatively hard, viscoelastic gel heel plug insert 88. Again, the viscoelastic gel sections could be located anywhere in the foot bed, but are preferably placed such that the relatively soft, flowable gel corresponds to those sections where the foot has the greatest contours and the relatively hard, higher viscosity gel corresponds to where the foot is subject to the greatest impact from walking, running or other activity. Thus, in the preferred embodiment, the viscoelastic gel section 84 and fingers 86 correspond to the foot arch area and extend around to the areas that correspond to the foot heel. The gels are again made to a -000 hardness between 10 and 100 and preferably in the range of 40 to 60.

The viscoelastic gel heel plug insert 88 is preferably located in the bottom of the foot bed to provided cushioning and shock absorption for the foot heel. This insert is preferably made of a gel having a -00 hardness between 20 and 60 and more preferably of approximately 40 to 50. The viscoelastic heel plug insert 88 preferable includes a plurality of ribs 89 to provide additional cushioning and absorption of shock for the foot heel.

The foot bed 80 also includes a foam heel plug 90 which is preferably formed of the same foot bed foam as the main body 82.

The preferred foot bed 80 also includes a plurality of grooves 92 that allow the flowable viscoelastic gel to extend up the back of the heel and that increase the flexibility of the foot bed 80. These grooves 92 are shown as extending around the outer edge of the foot bed and substantially in the vertical direction to provide proper flexibility of the foot bed.

FIGS. 9A–B disclose a second embodiment of a foot bed according to the present invention. The foot bed 81 includes the highly flowable viscoelastic section 84 and fingers 86 and the harder viscoelastic heel plug 88. The foot bed 81 further includes a metatarsal pad 94 with ribs 96 for providing cushioning to the foot. Still further, the foot bed includes wing members 98 with gel sections 100. These gel sections 100 can be made of the temperature-responsive gel and the water solution therein can flow in fingers 102 or the gel sections 100 and the fingers 102 can be made of the highly flowable viscoelastic gel. This provides a customized fit for the fore foot. Moreover, the wing members 98 can be provided with different thicknesses so that the customer can chose one that provides the most comfortable fit.

Figure 10:
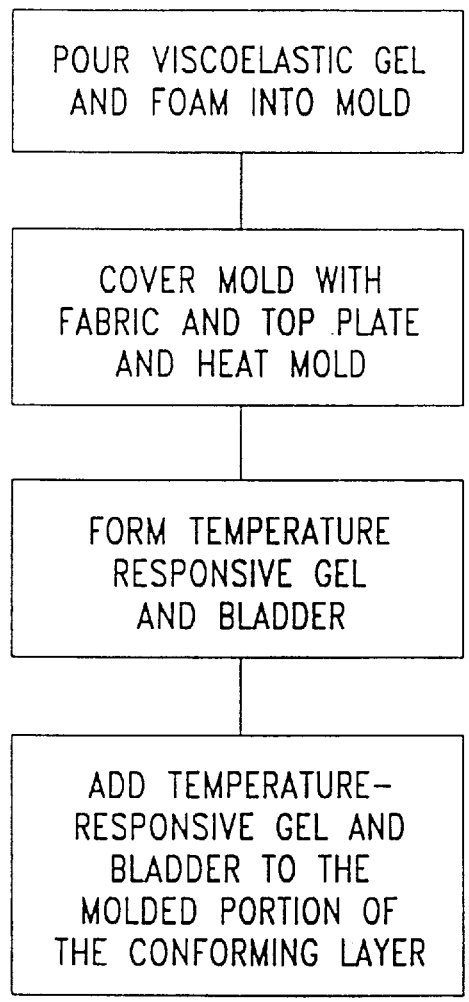
FIG. 10 is a flow chart of the method used to construct the shoe upper according the present invention.

FIG. 10 presents a flow chart of a method of forming a conforming shoe. The steps include forming a conforming shoe upper, as shown in FIG. 2, or tongue, as shown in FIG. 7, by pouring flowable, viscoelastic gel and foam ingredients into a mold to form a portion of the conforming layer of the shoe upper or tongue. Preferably, the viscoelastic gel is poured into the proper locations of a mold and then the memory foam ingredients are poured into the mold to fill the same. The inner layer of the shoe can be placed in the bottom of the mold before the gel and foam are poured therein such that the gel is formed on the inner layer. However, the preferred method is to attach the shoe inner layer to the top plate of the mold. The mold is closed with the top plate and the mold is heated. Heating can be accomplished by heating either the mold or the mold top or both to solidify the gel and foam. Thus, the flowable, viscoelastic gel and foam are molded onto the shoe inner layer.

The temperature-responsive gel is formed separately from the viscoelastic gel and foam. The temperature-responsive gel cassette and bladder are formed in a separate mold. A first layer of plastic film is placed into the mold. Preferably, the plastic film is about 10 mils thick and is a polyurethane film or a laminated film such as surlyn/polyethylene laminated film, to increase the water retention in the gel bladder. This film is vacuum formed over a cavity that is approximately 40 to 80 thousands of an inch thick. Then the responsive gel material is added at a relatively low temperature, preferably around 0 degrees celsius to keep the gel saturated with the water-based solution. Then a flat top layer of plastic film is laid over the mold. The top layer is preferably about 5 mils thick and formed of a polyurethane film or a laminated film such as surlyn/polyethylene laminate. The top and bottom layer films are then bonded by radio frequency bonding or other method.

The conforming layer of the shoe upper or tongue is completed by placing the temperature-responsive gel and bladder containing the same in the proper locations and attaching the shoe outer layer to the inner layer such that the conforming layer is between the outer layer and the inner layer.

After the shoe upper or tongue is formed, it is attached to the shoe in an ordinary manner.

The invention also includes another method that can be used to form adjacent regions of foam (polyurethane or other foam) and viscoelastic gel material. In this method, the foam and gel can be chemically bonded or unbonded and merely adjacent. More particularly, the method includes the steps of pouring foam material into a mold. Then viscoelastic gel with unexpanded microspheres can be injected into the mold cavity by a separate operation. The mold is then heated to a temperature above the expansion temperature of the microspheres. Depending on the temperature the mold is heated to, the expansion of the microspheres can be controlled to vary the pressure in the molded part.

Figure 11:
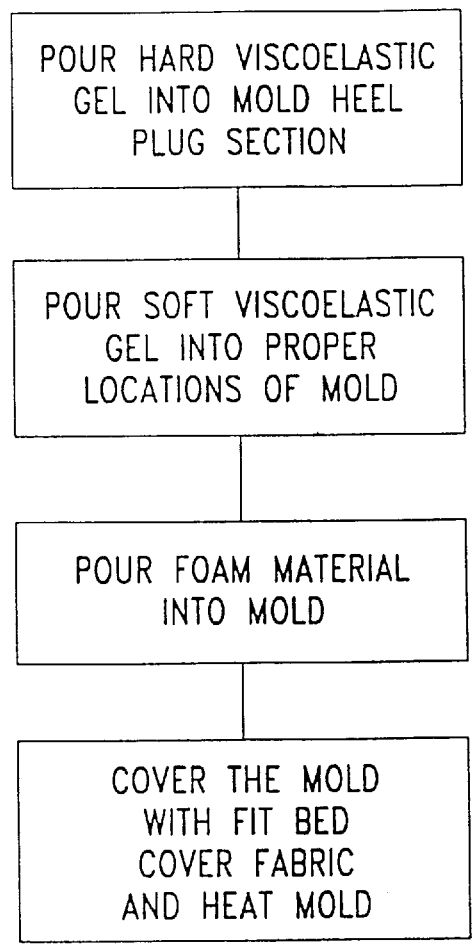
FIG. 11 is a flow chart of the method used to construct the foot bed according to the present invention.

Referring to FIG. 11, a shoe foot bed, as shown in FIGS. 8A–8D or 9, is formed by pouring relatively hard, high viscosity, viscoelastic gel into the foot bed heel plug section of a mold, pouring a relatively soft, low viscosity, viscoelastic gel into desired locations that can include the arch area and sections around the foot heel and pouring a foam ingredients into the mold and covering the mold with the mold top with the foot bed cover fabric attached thereto and heating the mold.

While it is apparent that the illustrative embodiment of the invention herein disclosed fulfills the objectives stated above, it will be appreciated that numerous modification and other embodiments may be devised by those skilled in the art. Therefore, it will be understood that the appended claims are intended to cover all such modifications and embodiments which come within the spirit and scope of the present invention.

We claim:

1. A method of forming a shoe component, comprising the steps of:

placing a viscoelastic gel and one or more foam-forming ingredients in a mold adjacent at least part of a shoe inner layer;

heating the viscoelastic gel and foam-forming ingredients in the mold to sufficiently form a foam matrix from the foam-forming ingredients which fixes the position of the viscoelastic gel in the foam matrix, thereby forming a first portion of a conforming layer that is adjacent to the inner layer;

placing a bladder which contains a temperature-responsive gel therein into contact with the foam matrix or viscoelastic gel to form a second portion of the conforming layer, wherein the temperature-responsive gel is in a liquid state at a first temperature and a gel state having a smaller amount of water in the liquid state at a second, different temperature; and attaching a shoe outer layer to the inner layer such that both the first and second portions of the conforming layer are contained between the inner layer and the outer layer to form the shoe component, wherein the temperature-responsive gel changes between the liquid state and the gel state due to heat from a wearer's foot disposed adjacent the component.

2. The method of claim 1, which further comprises selecting the viscoelastic gel to include a polyurethane, an elastomer or a butadiene block copolymer.

3. The method of claim 1, which further comprises selecting the temperature responsive gel to be a hydrogel.

4. The method of claim 1, which further comprises configuring the shoe component as a shoe upper.

5. The method of claim 1, which further comprises configuring the shoe component as a shoe tongue.

6. The method of claim 1, which further comprises selecting the inner layer to be a fabric.

7. The method of claim 1, wherein the foam-forming ingredients are selected to comprise at least one polyol and at least one isocyanate.

8. The method of claim 7, wherein the foam-forming ingredients are selected to further comprise a plurality of hollow microspheres.

9. The method of claim 1, wherein the conforming layer and inner layer are configured as a foot bed.

10. A method of forming a shoe component, comprising the steps of:

placing one or more foam-forming ingredients in a mold adjacent at least part of a shoe inner layer;

heating the foam-forming ingredients in the mold to sufficiently form a foam matrix, thereby forming a first portion of a conforming layer that is adjacent to the inner layer;

placing a bladder which contains a temperature-responsive gel therein into contact with the foam matrix to form a second portion of the conforming layer, wherein the temperature-responsive gel is in a more flowable liquid state at a first temperature and a less flowable gel state at a second, different temperature; and positioning a shoe outer layer relative to the inner layer such that both the first and second portions of the conforming layer are contained between the inner layer and the outer layer to form the shoe component, wherein the temperature-responsive gel changes between the liquid state and the gel state due to heat from a wearer's foot disposed adjacent the component.

11. The method of claim 10, which further comprises selecting the temperature-responsive gel to be a hydrogel.

12. The method of claim 10, which further comprises configuring the shoe component as a shoe upper.

13. The method of claim 10, which further comprises configuring the shoe component as a shoe tongue.

14. The method of claim 10, which further comprises selecting the inner layer to be a fabric.

15. The method of claim 10, wherein the foam-forming ingredients are selected to comprise at least one polyol and at least one isocyanate.

16. The method of claim 15, wherein the foam-forming ingredients further comprise a plurality of hollow microspheres.

17. The method of claim 10, wherein the conforming layer and inner layer are configured as a foot bed.

* * * * *